May 14, 1968  A. H. BURNER  3,382,538
SCREW PRESS WITH SLICING APPARATUS
Filed June 27, 1966  2 Sheets-Sheet 1

May 14, 1968 A. H. BURNER 3,382,538
SCREW PRESS WITH SLICING APPARATUS
Filed June 27, 1966 2 Sheets-Sheet 2

United States Patent Office 3,382,538
Patented May 14, 1968

3,382,538
SCREW PRESS WITH SLICING APPARATUS
Andre H. Burner, deceased, late of Piqua, Ohio, by Jean M. Burner, executrix, Piqua, Ohio, assignor to The French Oil Mill Machinery Company, Piqua, Ohio, a corporation of Ohio
Filed June 27, 1966, Ser. No. 560,982
6 Claims. (Cl. 18—12)

This invention relates to mechanical screw presses, and more particularly, to a screw press including an improved apparatus for breaking or cutting the material discharged from the press into small pieces.

The apparatus of the invention is related to the methods and types of apparatus shown in U.S. Patent No. 3,225,453 and in application Ser. No. 410,458, filed Nov. 12, 1964, now Patent No. 3,285,163, both assigned to the assignee of the present invention. The present invention primarily relates to a screw press which is suited for drying natural or synthetic rubber material having certain characteristics, however, it is to be understood that the apparatus provided by the invention may be used for handling other materials.

When rubber materials having a relatively low viscosity are processed by a mechanical screw press, as for removing moisture from the material, the heated dry material discharged from the press becomes soft and gummy and tends to coagulate or form into lumps. It is desirable, however, to have the material in the form of small pieces of about the same size as for baling and further use, and also to permit any slight residual moisture to flash off uniformly, thus providing a product of uniform size and appearance.

Accordingly, it is a primary object of the present invention to provide an improved mechanical screw press including a die plate apparatus which forms the material discharged from the press into a plurality of ribbons or the like for cutting into small uniform pieces.

As a more specific object, the present invention provides a screw press which is ideally suited for drying rubber materials of low Mooney viscosity and includes a die plate rotatably mounted at the discharge end of the press, and wherein the die plate includes a plurality of orifices through which the material is forced so that a cutter member mounted adjacent the exterior of the die plate can cut the extruded material into uniform thin pieces or flakes to provide the material in a form whereby a large surface area is exposed.

Another object is to provide a novel die plate construction for a screw press as outlined above, including an annular discharge opening which is upstream of the die plate and is adjustable for controlling the internal pressure within the press.

The present invention also provides a novel discharge construction for a screw press wherein the cutting member is rotated in a direction opposite to rotary motion of the die plate, to provide a high relative speed between the blades of the cutter member and the extrusion orifices formed within the die plate, and in which the cutting knives are removably mounted on the rotatable cutter member to provide for convenient replacement of the knives.

Other objects and advantages of the invention will be apparent from the following description, the accompanying drawings and the appended claims.

Figure 1:
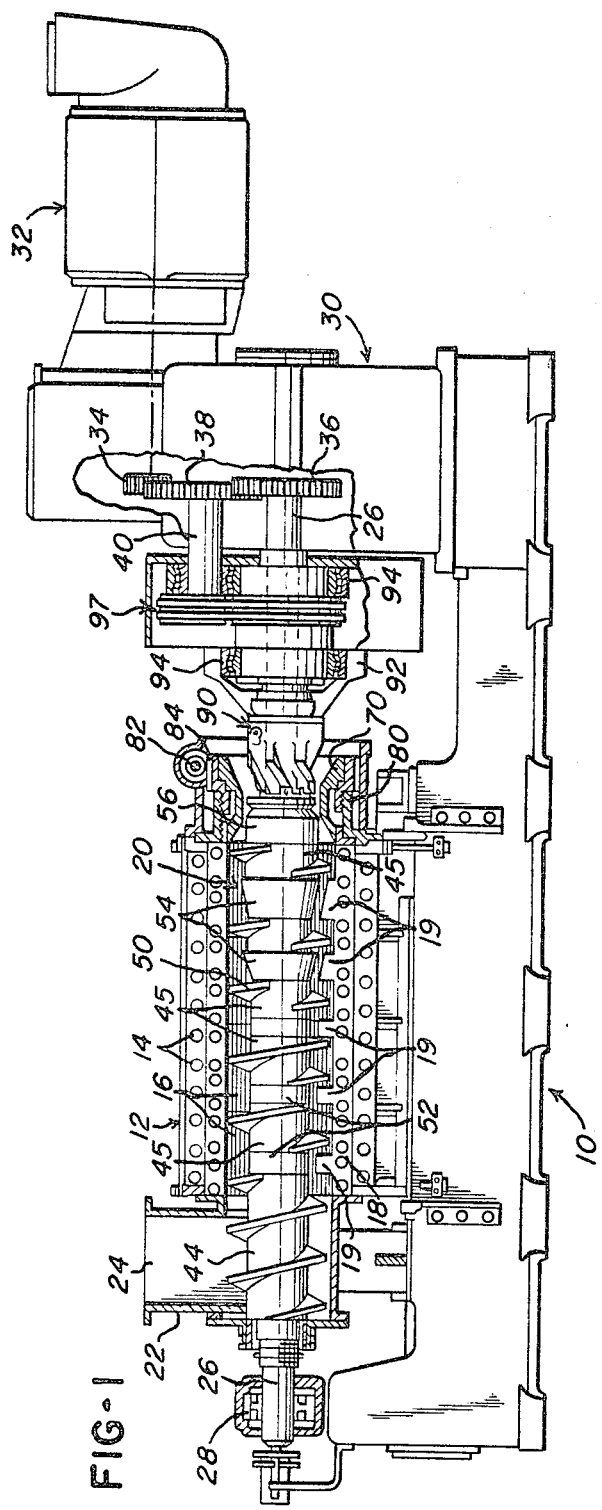
FIG. 1 is a side view of a screw press incorporating the die and cutting apparatus of the present invention with the press cage, feed hopper, and part of the drive shown in section.

Referring to the drawings which illustrate a preferred embodiment of the invention, FIG. 1 shows a mechanical screw press having an elongated base 10 which supports a cage 12, preferably formed in two half sections bolted together with suitable bolts extending through the openings 14. Forming the walls of the cage 12 are a series of elongated screen bars 16 which are secured by a series of retaining bars 18 having radially extending breaker bars 19 formed as an integral part thereof. Preferably, the screen bars 16, which are rectangular in cross sectional configuration, are spaced apart by a series of wedge shaped spacers (not shown) to define elongated drainage openings or slots from the pressing chamber 20.

At the inlet end of the cage 12 there is an inlet or feed housing or hopper 22 defining an inlet opening 24 through which the material, as for example, synthetic or natural rubber, is fed into the screw press. Extending through the feed housing 22 and the pressing chamber 20 is a shaft 26 which is rotatably supported at the inlet or feed end of the press by a bearing 28 mounted on the frame 10, and at the discharge end of the press by bearings (not shown) mounted within the gearbox 30.

The shaft 26 is driven by a motor 32 through a gear train (partially shown in FIG. 1) including a drive pinion 34 mounted on the shaft of the motor 32 and a series of driven gears including a gear 36 rigidly mounted on the shaft 26 and the gear 38 rigidly mounted on a stub shaft 40. The gearbox 30 may include further gears to provide a predetermined speed reduction between the motor shaft and the main shafts 26 and stub shaft 40.

Positioned within the feed housing 22 is a feed worm 44, and in the cage is a series of higher pressure worm members 45 having corresponding spiral flights 50, all driven by shaft 26. As shown in FIG. 1, the worm members 45 may be separated by a series of cylindrical collars 52 and tapered collars 54, which increase in diameter towards the discharge and to provide a progressive decrease in the volumetric space occupied by the material within the chamber 20. These collars 52 and 54 define a series of gaps or interruptions between the flights 50 and are spaced in axial location corresponding with the position of the breaker bars 19 so that the breaker bars extend inwardly between successive flights 50 for resisting rotation of the material passing between the worm member 45.

Figure 2:
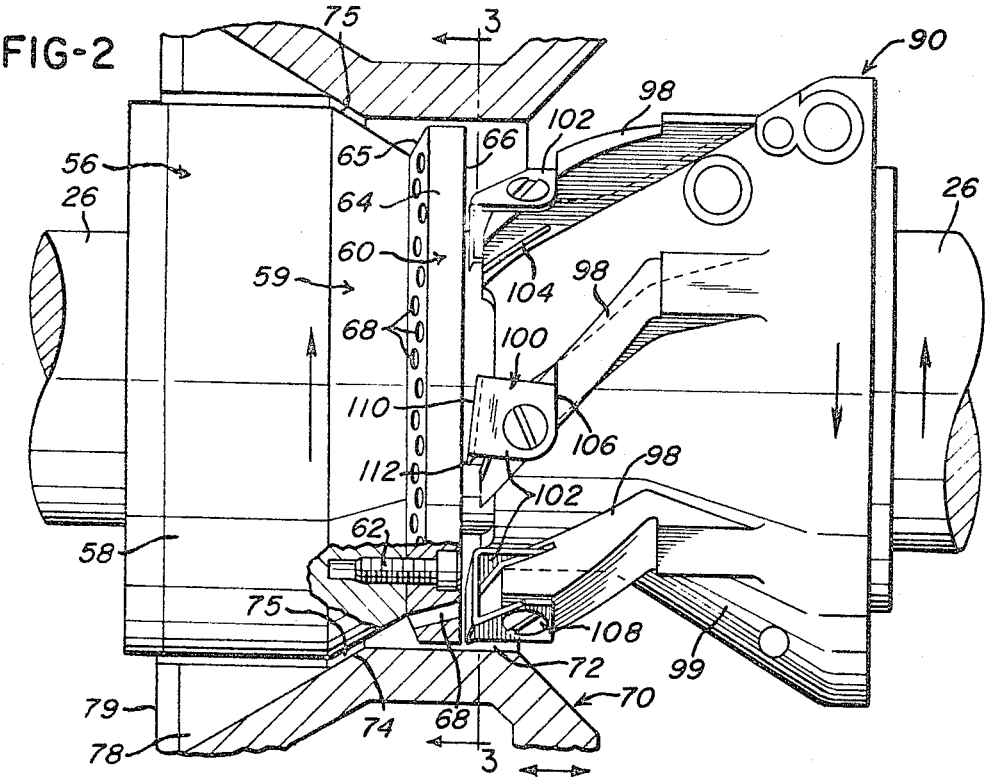
FIG. 2 is an enlarged view of the discharge end of the screw press showing the relationship between the discharge ring, the die plate and the cutter member.
Figure 3:
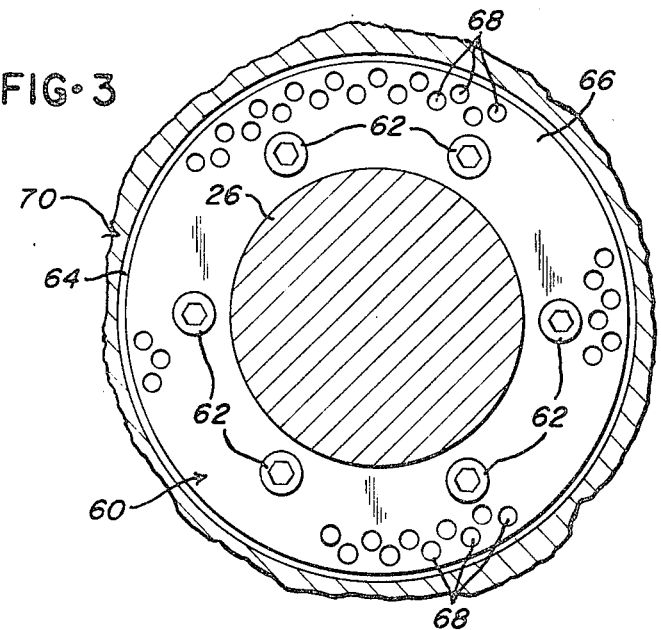
FIG. 3 is an axial view of the die plate as seen along the line 3—3 of FIG. 2.

Mounted on the main shaft 26 adjacent the end of the final worm member 45 is an annular discharge sleeve 56 (FIG. 2) which includes a cylindrical portion 58 and an upstream tapered or frusto-conical shaped portion 59. An annular die plate 60 is mounted on the end of the sleeve 56, within the portion 58, by a series of screws 62 (FIG. 3) and includes an outer cylindrical edge surface 64, a leading tapered surface 65 which intersects with the exterior surface of the tapered portion 59 of the sleeve 56, and a radially extending outer face 66. As shown in FIGS. 2 and 3, formed within the die plate 60 and arranged in an annular pattern, is a series of extrusion orifices 68, which are somewhat staggered as shown in FIG. 3, and are positioned on corresponding axes which cooperatively define a cone about the axis of the shaft 26.

Surrounding the sleeve 56 and the die plate 60 is a discharge ring 70 which defines an internal cylindrical surface 72 closely surrounding the cylindrical edge surface 64 of the die plate 60. The discharge ring 70 also has a frusto-conical or tapered surface 74 which preferably is formed on an angle corresponding to the angle of the tapered portion 59 of the sleeve 56 and cooperates therewith to define a variable annular discharge opening 75. Extending inwardly from the tapered surface 74, and positioned adjacent the cylindrical sleeve portion 58, are a series of uniformly spaced breaker lugs 78 having a sharp leading edge 79. These lugs are most readily formed as an integral part of ring 70.

As shown in FIG. 1, the discharge ring 70 is threadably mounted on a discharge housing 80 and is adapted to be axially adjusted within the housing 80 by manual or power rotation of a worm gear 82 which engages a spur gear 84 rigidly connected to the discharge ring 70. Thus the discharge ring 70 can be moved axially within the discharge housing 80 to change the size of the discharge opening 75.

However, throughout the full range of adjustment of the discharge ring 70, the cylindrical exterior surface 64 of the die plate 60 remains in close proximity to the internal cylindrical surface 72 of the discharge ring 70, and the material forced through the adjustable discharge opening 75 is then forced through the orifices 68 formed within the die plate 60. Preferably, the total cross-sectional area of the orifices 68 is greater than the normal operating cross-sectional area of the annular discharge opening 75, and the variable discharge opening 75 defines the primary restriction for the material and thus controls the internal pressure developed within the pressing chamber 20 by the rotation of the worm members 45.

Surrounding the main shaft 26, and positioned adjacent the die plate 60, is a cutter member 90. This member is rotatably supported independently on the main shaft 26 by an annular carrier or frame 92. As generally shown in FIG. 1 and described in greater detail in the above-mentioned application, the frame 92 is rotatably supported by a pair of bearing 94, and the cutter member 90 is adapted to be rotated in a reverse direction from the main shaft 26 by a belt drive 97, which connects a pulley mounted on the stub shaft 40 with a pulley formed as a part of the frame 92.

Referring to FIG. 2, the cutter member 90 includes a series of teeth 98 of a generally spiral configuration which are uniformly spaced around the outer generally conical surface 99 of the cutter member 90. Mounted on the end portion of each tooth 98 is a U-shaped blade or knife member 100 which includes a pair of ears 102, one of which extends into a slot 104 formed axially into the tooth 98, and the other of which is recessed within a notch 106 formed in the outer peripheral surface of the tooth 98. As shown, the ears 102 of each knife member 100 are secured to the corresponding tooth 98 by a screw 108 so that the knife member may be easily and conveniently removed for sharpening or replacement.

The flat bottom portion 110 of each knife member is provided with a sharp cutting edge 112 and is positioned at a slight inclination to the face 66 of the die plate 60. Preferably, the spacing between the cutting edge 112 and the face 66 is on the order of a few thousands of an inch. Thus as the material is discharged through the opening 75 and extruded through the orifices 68, it is separated into relatively thin slices or flakes by the knife members 100.

As the knife members 100 move with high relative speed past the orifices 68, the thin slices or flakes formed by the cutting edges 112 pass through the knife members 100, in the space defined between the knife bottom portion 110 and the end surface of the corresponding tooth 98. Thus when rubber material having a low Mooney viscosity is extruded through the orifices 68, the material is formed into flakes by the knife member 100 before the material has an opportunity to coagulate or form into soft sticky balls. As a result, the gummy rubber material is converted into a form by which a large surface area is exposed and any slight remaining moisture can escape in a uniform manner, such that the pieces of product have a uniform appearance.

From the drawings and the above description it can be seen that a mechanical screw press constructed in accordance with the present invention provides several desirable features and advantages. The screw press incorporates a die plate which is adapted to rotate with the main shaft and worm members so that the material discharged from the press is formed into small extrusions, and the rotating die plate cooperates with the knife members to form the material extruded through the die plate into relatively thin slices or flakes thereby exposing a large surface area. Furthermore, the knife members 100 are adapted to be rotated in a direction opposite to that of the die plate so that a high relative speed is provided between the die plate orifices and the adjacent knife members without requiring a high speed rotation of either the knife members or the main screw shaft.

As a further feature, the primary discharge opening 75 for the screw press may be varied to control the internal pressure within the screw press without affecting the closely spaced relationship between the face 66 of the die plate 60 and the cutting edge 112 of the knife members 100.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved mechanical screw press for handling a solid material such as rubber and adapted to deliver the material in the form of small pieces for providing a large total surface area, comprising a tubular press cage defining a pressing chamber having an inlet and a discharge end, a rotatable shaft extending through said chamber, screw flight means on said shaft for conveying material through said chamber and subjecting the material to mechanical pressure and working, a ring member mounted at said discharge end and having a tapered surface and a cylindrical surface through which the material is discharged in that order, a sleeve member carried on said shaft to extend into said ring member, said sleeve member having a tapered surface cooperatively arranged within the tapered surface of said ring member and also having an end portion extending at least partially within said cylindrical surface of said ring member, means for causing relative movement between said ring member and said sleeve member to change the spacing between said tapered surfaces for regulating the size of the annular opening therebetween, a circular die plate mounted at said end portion of said sleeve for rotation therewith and having an outer periphery in closely spaced relationship with said cylindrical surface, means defining a plurality of extrusion orifices of predetermined size through said die plate forming a multiplicity of passages for the material forced through said annular opening, said orifices providing a total opening at least equal to the maximum opening normally available between said tapered surfaces, and drive means for rotating said shaft and said die plate causing the material to be extruded through said orifices.

2. A screw as outlined in claim 1 including a cutter member positioned adjacent the exterior of said ring member and extending partially therein and including at least one knife positioned to sweep past the discharge ends of said orifices, and drive means for rotating said cutter member past said die plate to form the material extruded through said orifices into small pieces.

3. A screw press as defined in claim 2 wherein the respective drive means for rotating said shaft and for rotating said cutter member operate in opposite directions to provide a relatively high difference in speed between said knives and said orifices to cut the material extruded through the orifices into small flakes.

4. A screw press as defined in claim 2 wherein said die plate includes a flat outer working face and means for rotatably mounting said cutter member with said knife adjacent said face.

5. A screw press as defined in claim 4 including a plurality of knives, and means removably mounting each of said knives on said cutter member to provide for convenient and individual sharpening of said knives.

6. A screw press as defined in claim 5 wherein said knives are U-shaped in configuration forming a generally flat cutting portion adjacent said working face, and means for mounting said knives on said cutter member defining a space adjacent said flat cutting portion through which said flakes can pass with minimum resistance.

References Cited

UNITED STATES PATENTS

| | | |
|---|---|---|
| 2,059,486 | 11/1936 | Payne et al. |
| 2,488,129 | 11/1949 | La Lande. |
| 2,868,143 | 1/1959 | Strahmann _____ 107—14.5 X |
| 3,017,845 | 1/1962 | Bonnafoux. |
| 3,164,862 | 1/1965 | Zies. |
| 3,266,090 | 8/1966 | Gosney. |
| 3,285,163 | 11/1966 | Burner. |
| 3,287,764 | 11/1966 | Swickard et al. |

WILLIAM J. STEPHENSON, *Primary Examiner.*